US008219380B1

(12) United States Patent
Hosmer

(10) Patent No.: US 8,219,380 B1
(45) Date of Patent: Jul. 10, 2012

(54) METHODS AND SYSTEMS UTILIZING BEHAVIORAL DATA MODELS WITH DERIVED PROPERTIES

(75) Inventor: Basil Hosmer, Winchester, MA (US)

(73) Assignee: Adobe Systems Incorporated, San Jose, CA (US)

(*) Notice: Subject to any disclaimer, the term of this patent is extended or adjusted under 35 U.S.C. 154(b) by 674 days.

(21) Appl. No.: 12/368,523

(22) Filed: Feb. 10, 2009

Related U.S. Application Data

(60) Provisional application No. 61/114,560, filed on Nov. 14, 2008.

(51) Int. Cl.
G06F 9/45 (2006.01)
(52) U.S. Cl. ........ 703/22; 717/104; 717/114; 707/999.1
(58) Field of Classification Search .................. 703/22; 717/104, 105; 707/999.1, 999.002; 718/104
See application file for complete search history.

(56) References Cited

U.S. PATENT DOCUMENTS

| | | | |
|---|---|---|---|
| 5,404,319 A * | 4/1995 | Smith et al. | 716/103 |
| 5,465,351 A | 11/1995 | Lemmo | |
| 6,904,454 B2 * | 6/2005 | Stickler | 709/213 |
| 7,039,897 B2 | 5/2006 | Anderson et al. | |
| 7,200,627 B2 * | 4/2007 | Stickler | 1/1 |
| 7,254,570 B2 * | 8/2007 | Stickler | 1/1 |
| 7,428,546 B2 * | 9/2008 | Nori et al. | 1/1 |
| 7,941,309 B2 * | 5/2011 | Dublish et al. | 703/13 |
| 2005/0256907 A1 * | 11/2005 | Novik et al. | 707/200 |
| 2006/0004548 A1 * | 1/2006 | Santos et al. | 703/1 |
| 2007/0088725 A1 * | 4/2007 | Demiroski et al. | 707/100 |
| 2007/0234308 A1 * | 10/2007 | Feigenbaum et al. | 717/130 |
| 2008/0244595 A1 * | 10/2008 | Eilam et al. | 718/104 |
| 2009/0228261 A1 * | 9/2009 | Chulani et al. | 703/22 |

OTHER PUBLICATIONS

Wuyts et al, A Data-Centric Approach to Composing Embedded, Real-Time Software Components, Journal of Systems and Software, vol. 4, No. 1, Jan. 2005, pp. 25-34.*
Lopez-Sanz et al, Modelling of Service-Oriented Architectures with UML, Electronic Notes in Theoretical Computer Science, vol. 194, No. 4, Apr. 2008, pp. 23-37.*
"Ada (programming language)", available at http://en.wikipedia.org/wiki/Ada_programming_language (last accessed Feb. 26, 2009).
"IBM White Paper: The Value of Modeling (2004)", available at ftp://ftp.software.ibm.com/software/rational/web/whitepapers/ValueOfModeling.pdf (last accessed Feb. 26, 2009).
"Object Constraint Language", available at http://en.wikipedia.org/wiki/Object_Constraint_Language (last accessed Feb. 26, 2009).

(Continued)

*Primary Examiner* — Russell Frejd
(74) *Attorney, Agent, or Firm* — Kilpatrick Townsend & Stockton LLP

(57) ABSTRACT

Embodiments include computer systems, methods, and program code for developing and utilizing behavioral data models. A model can comprise a property and a behavior of the modeled component, with the property defining a data element of the modeled component and the behavior comprising a programmatic expression defining an operation to be performed when the model is consumed. The programmatic expression can comprise as a function to be evaluated to determine a derived property from an input parameter. The model may comprise data representing a constraint to be met by data of an instance of the derived property. The code of a functional component generated based on the behavior can be configured to evaluate data stored in the data structure corresponding to the derived property against the constraint and store data representing whether the constraint is satisfied.

20 Claims, 8 Drawing Sheets

OTHER PUBLICATIONS

"Rational Rose Data Sheet", available at http://www-01.ibm.com/software/awdtools/developer/rose/index.html (last accessed Feb. 26, 2009).

"The Eclipse Modeling Framework", available at http://www.eclipse.org/modeling/emf/ (last accessed Feb. 26, 2009).

"Unified Modeling Language", available at http://en.wikipedia.org/wiki/Unified_Modeling_Language (last accessed Feb. 26, 2009).

Jason, G., "UML for Java Developers", available at http://www.parlezuml.com/tutorials/umlforjava/java_ocl.pdf (2005) (last accessed Feb. 26, 2009).

Mandar, C. et al., "UML Tools (date unknown)", available at http://www.developer.com/design/article.php/1593811 (last accessed Feb. 26, 2009).

U.S. Appl. No. 12/368,575, filed Feb. 10, 2009, entitled Methods and Systems Utilizing Behavioral Data Models With Views, Basil Hosmer, inventor.

U.S. Appl. No. 12/368,635, filed Feb. 10, 2009, entitled Methods and Systems Utilizing Behavioral Data Models With Variants, Basil Hosmer, inventor.

U.S. Appl. No. 12/368,447, filed Feb. 10, 2009, entitled Methods and Systems Utilizing Behavioral Data Models, Basil Hosmer, inventor.

Non Final Office Action in related U.S. Appl. No. 12/368,635 dated Jan. 5, 2012.

Non Final Office Action in related U.S. Appl. No. 12/368,447 dated Jan. 27, 2012.

* cited by examiner

| |
|---|
| Model 300 |
| Property 301 |
| Property 302 |
| Derived Property F(Property1, Property 2) 304 |
| Constraint: True if Prop 2 > x    306 |
| Variant 1 if Prop 1 < y     308 |
| Property   309 |
| Variant 2 if Prop 1 >= y     310 |
| Property 311 |
| |

METHODS AND SYSTEMS UTILIZING BEHAVIORAL DATA MODELS WITH DERIVED PROPERTIES

PRIORITY CLAIM

This application claims priority to U.S. Patent Application No. 61/114,560, filed Nov. 14, 2008, and entitled "Behavioral Data Model Driven Systems," which is incorporated by reference herein in its entirety.

CROSS-REFERENCE TO RELATED APPLICATIONS

Each of the following U.S. Patent Applications filed on the same day as the present application and naming Basil Hosmer as inventor is incorporated by reference herein in its entirety: U.S. patent application Ser. No. 12/368,447, entitled "Methods and Systems Utilizing Behavioral Data Models"; U.S. patent application Ser. No. 12/368,575, entitled "Methods and Systems Utilizing Behavioral Data Models with Views"; and U.S. patent application Ser. No. 12/368,635, entitled "Methods and Systems Utilizing Behavioral Data Models with Variants".

BACKGROUND

In software engineering, a model comprises an abstract description of the software component(s) used by a software system of one or more applications, processes, or other functional units. A model can be defined using a modeling language that typically comprises a consistent set of rules used to interpret the syntax used to express the model. The model can formally define the structure and meaning of data.

For example, a modeled component can comprise a collection of information referred to as a "class" in object-oriented programming, and an "employee" object may comprise a collection of properties (data elements) for a particular instance of an "employee" class. The properties can include, for example, a character parameter "name," an integer parameter "empID," and an integer parameter "dob" that is defined in code as:

Class Employee {char *name; int empID; int dob}

Other programming languages may express the information represented by the "employee" grouping and its properties differently. A data model for the information represented by the "employee" class may be expressed more generally in a modeling language. For example, the model may reflect that on a more abstract level an "employee" component can include an employee's first name, last name, employee number, and date of birth.

Various modeling languages exist that allow for modeling of data and processes of an application. For example, Unified Modeling Language (UML) provides a graphical language for modeling various aspects of a software system. Code generation based on models, such as UML, can allow a skeleton or framework of source code to be produced based on model specifications. For example, the "employee model" may be used to generate the "Employee" class noted above or another logical expression of the employee component.

Although useful in certain situations, existing modeling languages and implementations are not ideal. For example, a given unit of a software system can include data elements (e.g., properties) and functional components (e.g., methods, processes, etc.) that operate on data elements to process input and/or to provide output.

Existing modeling solutions may not be able to fully express the nature of such a software system in an extensible and flexible manner. For instance, even if a model is used to generate a skeleton or framework, developers may still need to tie the framework together manually, such as by adding operations to support user interfaces, evaluation of classes or other parameter groups, and customizing the framework for different situations.

SUMMARY

Embodiments include a computer system comprising a processor with access to a computer-readable medium, the computer-readable medium embodying program components comprising a model of a modeled component and a computer application. The model can comprise a property and a behavior of the modeled component, with the property defining a data element of the modeled component and the behavior comprising a programmatic expression defining an operation to be performed when the model is consumed. The programmatic expression can comprise a function to be evaluated to determine a derived property from an input parameter. The input parameter may correspond to data stored via the property or may correspond to a parameter outside the model. The computer application can be configured to consume the model by generating an in-memory representation of the modeled component. The in-memory representation can comprise a data structure corresponding to the property, a functional component comprising code configured to implement the behavior, and a data structure corresponding to the derived property. Embodiments also include computer-implemented methods and program code embodied in a computer-readable medium for accessing a model and consuming the model.

In some embodiments, the model further comprises data representing a constraint specifying a condition to be met by data of an instance of the derived property. The code of the functional component can be configured to evaluate data stored in the data structure corresponding to the derived property against the constraint and store data representing whether the constraint is satisfied.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments through use of the teachings herein.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
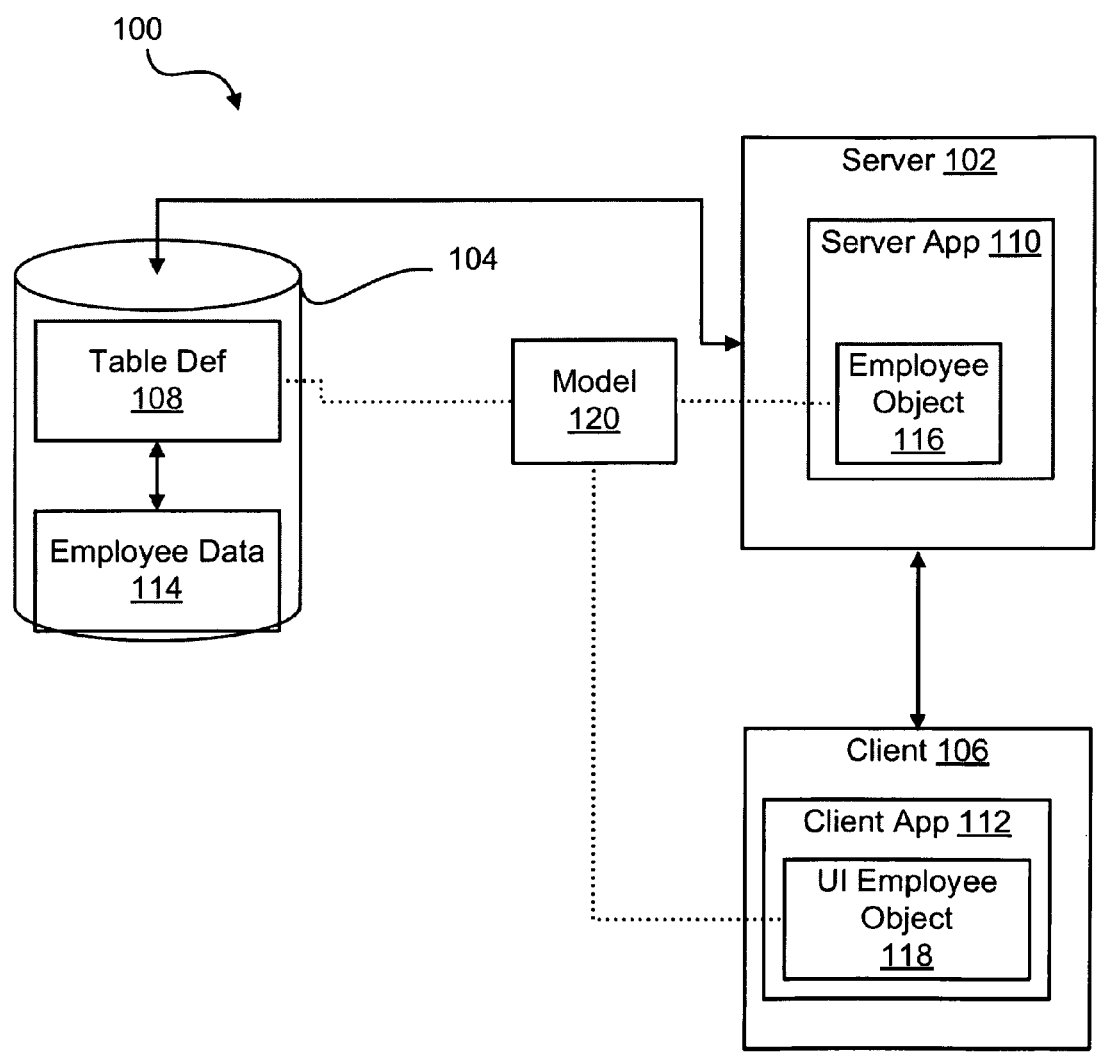
FIG. 1 is a block diagram illustrating an exemplary software system.

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In accordance with aspects of the present subject matter, a modeling language can support a model that describes a software component in terms of properties and behaviors, explained further below. A model can be consumed (i.e., used) to yield an in-memory representation of the properties and behaviors. The model can be consumed by any suitable number of type of software systems or units of a software system. Thus, the term consumed can refer to any use of the model by a software component, including (but not limited to) use of the model in generating code and/or in imparting meaning to data.

A property can refer to a model element that defines a data element of the modeled component and results in a data structure when the model is consumed. Examples of data structures include, but are not limited to, an object, a class, or other logical unit used by a program component (whether generated from the model or from another source) to refer to data that is accessed and/or stored during course of operation of the program component.

A behavior can refer to a model element that defines an aspect of the modeled program component beyond the identity or structure of a data property. A behavior can define an evaluation to be made and/or an operation to be performed in conjunction with one or more aspects of the modeled component when the model is used. As used herein, a behavior defines an operation by way of a programmatic expression using a modeling language. For example, a programmatic expression can comprise mathematical, logical, or another operation on one or more input parameters. A behavior can result in a functional component when the model is consumed—i.e. one or more code segments that operate on one or more inputs to provide output. Examples of functional components include, but are not limited to, a method, subroutine, routine, or process.

For example, a behavior may comprise a programmatic expression for determining a derived property from an input parameter, with the input parameter referring to a property of the modeled component and/or a component other than the modeled component. In some embodiments, the model may include constraints specifying conditions for testing the data values of instances of derived properties. For example, a constraint may be used to validate data provided via a modeled component when the modeled component is used.

As another example, a model can specify variants, which are variably-applicable portions of the model for use under specified conditions. For example, a model may define a first variant for a component and a second variant for the component, with choice of a first or second variant made when the model is used based on property values and/or other conditions.

In some embodiments, a model can specify one or more views that abstractly represent a user interface calculated over a particular model. For example, a particular modeled component may include properties and behaviors that will be expressed using different functionality. Views can be used to define how elements of the model can be handled by different consuming software components.

As noted above, a model can be consumed to generate an in-memory representation of the modeled component. As used herein, an in-memory representation can comprise one or more data structures that are generated based on modeled properties and one or more functional components comprising code segment(s) that implement the behavior. The in-memory representation can feature data structures and code segments specified using a syntax so that the data structures and code segments can be manipulated and/or used by the consuming application.

Consuming a model need not result in a separate computer application. Rather, in some embodiments, an application might load a model and use it to drive application behavior directly for a runtime or dynamic use of the model. For example, one or more data structures and functional components may be accessed by the application that consumes the model to process data by using the model to receive, evaluate, and/or analyze data for input or output. For instance, the behaviors may result in subroutines or processes expressed as code segments accessed by the application that consumes the model. The data structures may be used to handle data for input, provide data for output, and/or to store data by the generating application.

However, a model can be consumed to generate program components. At a general level, a program component can comprise a set of data that can be used in the operation of a computer system, and the term can include data structures and/or code. The program components may be expressed as source code and/or object code (i.e., executable code).

For example, an application development tool may consume modeled components to generate code specifying objects or classes based on the modeled components. Behaviors, when consumed, can result in code that accesses the properties and function(s) specified in the model to operate over the properties. If a model defines variants, then the portion(s) of the model that are used to generate code can vary according to conditions specified by the consuming software component.

As another example, the program components may comprise a configuration file used for a database, with the data structure(s) used to determine how data is stored in the database. The functional component(s) can be used to provide output to determine additional data items to store based on other input, and/or to validate input.

In some embodiments, an architecture is used to allow models to be consumed by different types of components by specifying one or more libraries that allow for consumption of models. Specifically, a code library can be referenced by a consuming software component to define functions that are used to evaluate model syntax and provide output in a form that is meaningful to the consuming software component. For example, if the consuming software component is a JAVA-based application development tool, the library can comprise JAVA code for parsing the syntax of a model and compiling the model into JAVA code for use in the application development tool or into other code for other purposes. For example, although JAVA-based, the application development tool may be used to develop applications using other languages or may be used to generate object code based on the model.

FIG. 1 is a block diagram illustrating an exemplary software system 100 comprising a plurality of applications used to provide access to employee data. Although several examples herein refer to "applications," it should be understood that a software system can comprise one or more functional units that may be referred to by various names, including applications, processes, and the like.

In this example, a server 102 is used to provide access to a database 104 by a client 106. For example, server 102 may be implemented on one computing platform that may utilize a separate computing platform for managing and providing database 104; alternatively, the same hardware may be used. Client 106 may comprise a separate computing platform, such as a personal computer, PDA, telephone, or the like that accesses server 102 via an appropriate network connection.

Several applications and other functional units are used in software system 100 to relay information between client platform 106 and database 104. In this example, a database table definition 108 is used to define and manage how employee data 114 is stored and retrieved. Server application 110 is used to access employee data 114 via database table definition 108 and to receive requests from client 106 and provide appropriate responses to client 106. Client application 112 is used to provide a suitable user interface for receiving user input, providing output, and interfacing with server application 110.

Each functional unit of software system 100 is handling a collection of information constituting an "employee" component in this example. For example, database table definition 108 interacts with raw employee data 114. Server application 110 represents the employee data as an employee object 116. Client application 112 represents the employee data as a UI employee object 118 (e.g., data specifying how data received from server 102 will be rendered by the user interface of client 106).

The "employee" information may be represented in different ways for different components. In this example, the components that represent employee information are raw employee data 114, database table definition 108, employee object 116, and UI employee object 118. For example, employee data 114 may represent the employee data as one or more tables having rows and columns specified in database table definition 108. Employee object 116 may represent a nested structure of properties for one or more employee records accessed from database 104. A UI employee object may represent particular portions of data provided to client 106 based on employee object 116 along with particular properties for rendering the data for consumption by an end user (e.g., different properties may be provided for display in different portions of a screen).

Despite the different manner in which the components of various functional units of software system 100 represent "employee" information, the "employee" information can be abstracted into a model 120 that symbolically represents the "employee" information.

Figures 2, 3:
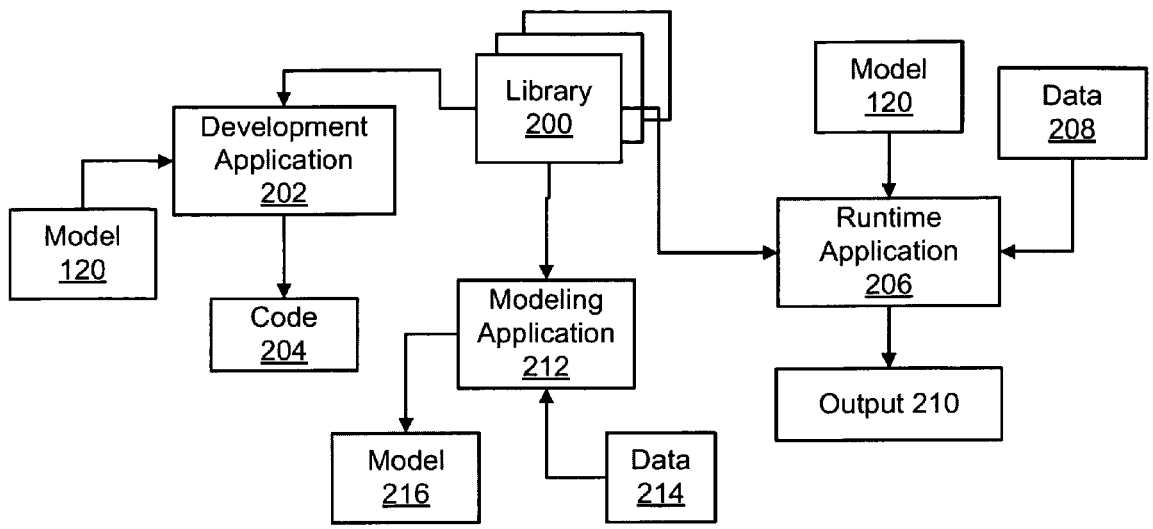
FIG. 2 is a block diagram showing an example of use of a modeling library to facilitate consumption of models by various consuming applications.
FIG. 3 is block diagram illustrating aspects of an exemplary model.

FIG. 2 is a block diagram showing an example of use of a core library to facilitate consumption of models by various consuming applications or other functional units. In this example, a core library 200 is shown as accessible to a plurality of software applications 202 and 206 that can, by virtue of library 200, consume model 120 to provide output. FIG. 2 illustrates modeling application 212 that can consume data 214 and produce a model 216 based on library 200, as well.

A library 200 can comprise program code that allows an application to recognize the syntax of a model. For example, a library 200 may define a plurality of functions for parsing model language and translating the model language into recognizable units for the application referencing the model. Multiple libraries can be used in some embodiments.

For example, development application 202 may rely on a library 200 to parse model 120 and generate code 204. Code 204 may comprise one or more program components based on model 120. Additionally or alternatively, development application 202 may utilize an in-memory representation of the model to facilitate the coding process. As another example, runtime application 206 may rely on a library 200 to parse model 120 and determine conditions for evaluating data 208 in order to provide output 210. For instance, model 120 may be used to generate subroutines and related data structures accessible by runtime application 206. Modeling application 212 may rely on a library 200 to determine the proper syntax for expressing a model 216 based on evaluating the structure and/or content of data 214.

FIG. 3 is block diagram illustrating aspects of an exemplary model 300 supported by embodiments of the present subject matter. In this example, model 300 specifies properties 301 and 302 of the modeled component. However, model 300 also specifies what are referred to as "behaviors" of the modeled component. A used herein, a "behavior" can include, but is not limited to, one or more of: a derived property, a constraint, and a variant expressed in a model. Model 300 includes a derived property 304, a constraint 206, and two variants (i.e. variably-applicable portions of the model) 308 and 310.

Variant 308 features a property 309 and variant 310 features a property 311. However, properties 309 and 311 in this example do not appear outside their respective variant. As will be discussed later below, variants may be used to provide flexibility when defining a model that will represent a component whose constituent elements differ depending on circumstances at the time the modeled component is rendered. As another example, a variant may be used to provide an in-memory representation that includes constituent elements for multiple scenarios and suitable functional components to evaluate which elements to use.

Figure 4:
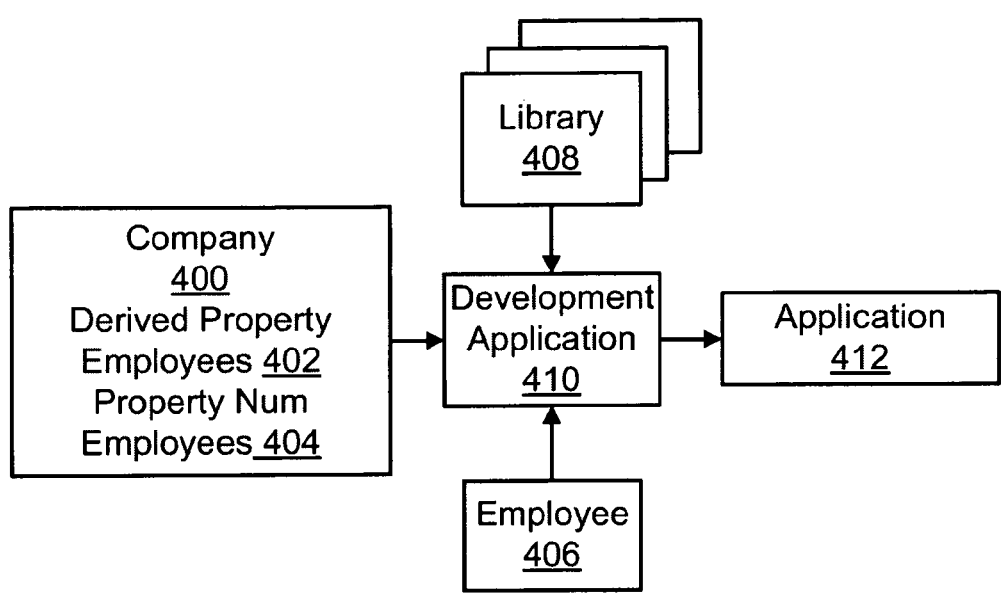
FIG. 4 is a block diagram illustrating an example of consuming a model that includes derived properties.

FIG. 4 is a block diagram illustrating an example of consuming a "company" model 400 that includes derived properties. A model can include a behavior comprising a derived property by way of a programmatic expression defining one or more operations to be performed on an input parameter. For example, an input parameter may be another property of the model. In this example, a "company" model 400 specifies a derived property "Number of Employees" 402 and a property "employees" 404. The "employees" property may simply be a collection of "employee" objects, with an "employee" model 406 included for reference in FIG. 4. The derived property "Number of Employees" 402 can be represented in the model as a function that determines the number of instances included in the "employee" collection 404.

In this example, a development application 410 consumes model 400 (and model 406) using library 408 to provide program components expressed as code for an application 412. Library 408 allows development application 410 to translate the model specifications into appropriate source code elements. For example, development application may use models 400/406 to create corresponding objects for handling "company" and "employees" in application 412. Based on the syntax of model 400 specifying that "number of employees" is derived from the collection property "employees" 404, application 412 can include code corresponding to a function (e.g., a counting function) that determines the number of "employee" objects and a property of the "company" object referencing the result of the counting function.

As another example, consider the (pseudocode) model for an object representing a "person":
object Person is
property firstName: String,
property lastName: String
property dateOfBirth: Date;
property fullName=lastName+","+firstName,
property age=years(today( )-dateOfBirth);

In this example, the model library can specify how the particular syntax is to be translated into code or other expressions; for purposes of this discussion, the modeling language includes a string-concatenation operator name '+' and the ability to specify constant strings using double quotes ("). The library also recognizes a function today( ) that returns the current date, a subtraction operator ("−") and a function called "years( )" that extracts the number of years from a time value.

The representation of a modeled object in a running application can have the derived properties without the need for hand-coding the functions to determine the derived properties. Instead, by recognizing references to the functions, when the model is "rendered," appropriate functions can be evaluated to provide the derived properties. In the example of FIG. 4, the model is "rendered" by generating source code, but other examples include runtime interpretation of models and/or hybrid approaches of generating code for certain portions/models and runtime interpretation for other portions/models. For example, when the model is consumed, a data structure for the derived property and code for evaluating the derived property may be generated and maintained in memory. The consuming application can access the input parameter and use the code for evaluating the derived property to populate the data structure for the derived property.

Figure 5:
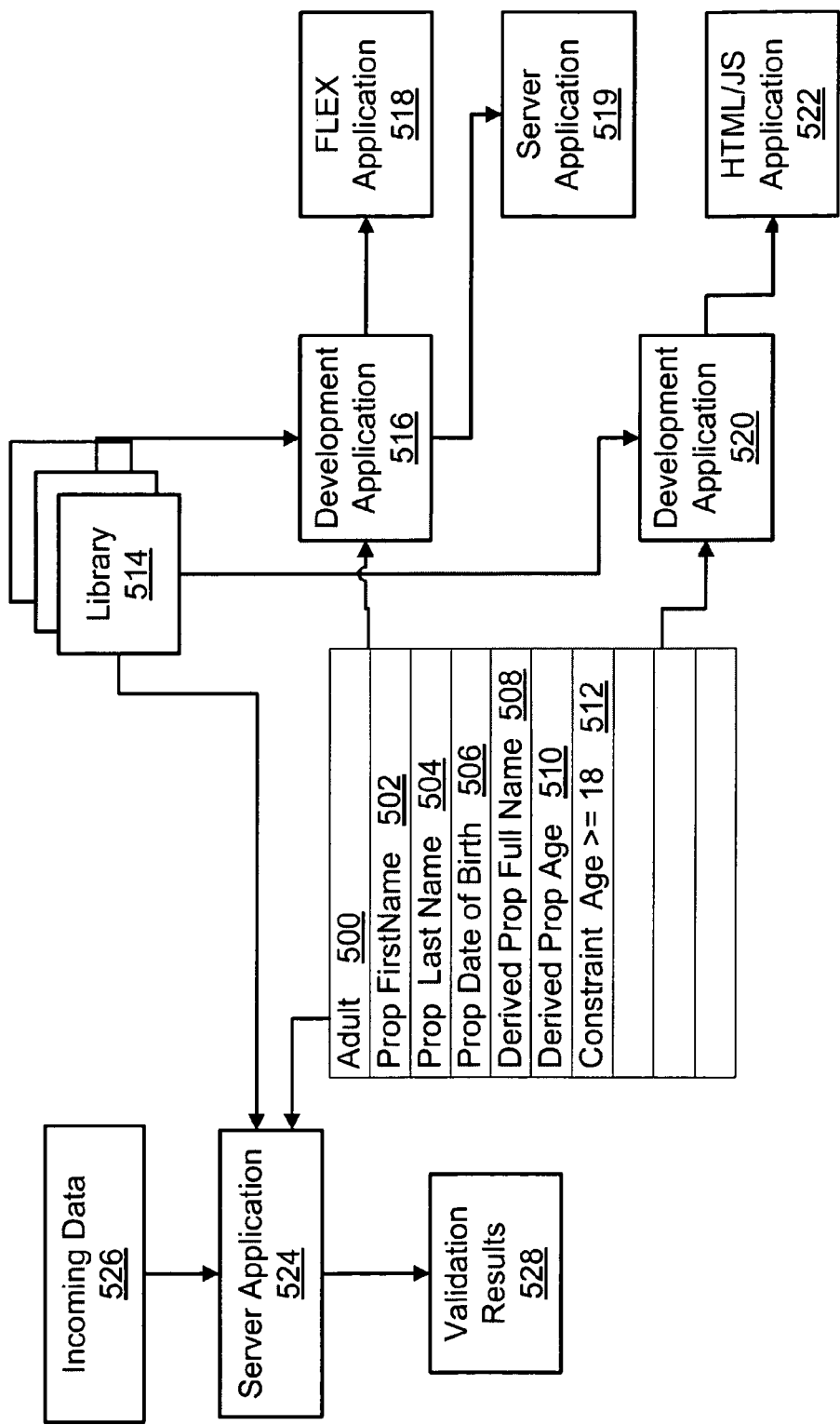
FIG. 5 is a block diagram illustrating an example of consuming a model that includes a constraint.

FIG. 5 is a block diagram illustrating an example of consuming a model 500 that includes a constraint. In this example, an "adult" object 500 includes a property firstName 502, a property last name 504, a property date of birth 504, a derived property full name 508, and a derived property age 510. However, a constraint 512 is included that indicates that a valid "adult" object is one where the "age" property is greater than 18.

The following pseudocode represents an example of an "adult" object:
object Adult is
property firstName: String,
property lastName: String
property dateOfBirth: Date;
property fullName=lastName+","+firstName,
property age=years(today( )-dateOfBirth);
constraint is Adult=age>=18;

In the example of FIG. 5, model 500 is consumed by several consuming applications via library 514. For example, development application 516 may be used to author a FLEX® application for use with ADOBE® FLASH® or ADOBE® AIR™ (all available from Adobe Systems Inc. of San Jose, Calif.) that uses an object representing an Adult. For example, an object in application 518 may be used to receive user input for a web-based service to update a voter registration database, with the object comprising a data structure based on the properties specified by model 500. The constraint may be used to generate code that prevents uploading a record corresponding to a non-adult. Development application 516 may be used to generate code for a server application 519 that validates incoming records to ensure that the record refers to an adult.

A development application may include appropriate user interface elements (e.g., wizards, dialogs, etc.) to receive user input specifying how the constraint is to be expressed in code. For example, a user may provide input specifying use of the "Adult" model and the development application can generate software code representing an "adult" object and functions for generating the derived properties and evaluating the constraint. The user may select actions to be taken when the constraint is not met and appropriate code may be generated to implement the desired action(s). In some embodiments, actions are automatically selected for handling when the constraint is not met and appropriate code is then generated.

FIG. 5 also shows another development application 520. For instance, development application 520 may rely on library 514 to interpret model 500 to generate an AJAX (Asynchronous Javascript and XML)-based application in HTML (labeled as HTML/JS application 522) that utilizes the "Adult" object to validate results input via a form or other element generated in a web browser. In interpreting model 500, appropriate HTML, Javascript, and other code can be generated to facilitate collection and validation of the same data.

FIG. 5 shows a further example of using model 500. In this example, model 500 is used by a server application 524 to validate incoming data 526 to provide validation results 528. For example, server application 524 may be intended to update a voter registration database with data from a variety of sources. Model 500 can be used to validate the incoming data via one or more in-memory representations of the modeled component and accessed by server application 524. In this example, server application 524 includes or has access to code that identifies the date of birth in incoming data and, based on model 500, can derive an age via model element 510 and test the age constraint via model element 512.

For instance, server application 524 may have access to library 514 to generate the code used for evaluating model 500 at runtime. Validation results 528 may comprise, for example, an indication as to whether the record should be used to update the database and/or an error or confirmation message relayed to the provider of data 526. The data structure(s) used for providing validation results 528 may be specified in model 514 or a separate "result" model.

The flexibility provided by use of a modeling language with properties and behaviors consumable via a common library is apparent when considering a change to the underlying context in which data is used. For instance, if the voting age is lowered or raised, in the absence of a model, then applications 518, 519, 522, and 524 would be recoded separately by hand. Instead, model 500 can be edited and then appropriate development tools can automatically update applications 518, 519, and 522. As another example, consider if an additional requirement were added for validating the voter registration database—e.g., a residency requirement setting forth that a valid "Adult" must be a California resident. Model 500 could be updated to include a residency property or a property derived from reference to an external source. A constraint could be added to model 500 representing how particular residencies were to be excluded (e.g., constraint2 is Adult=state="California"). Appropriate code could then be generated based on the updated model 500 to evaluate the new constraint when the model is consumed.

Figure 6:
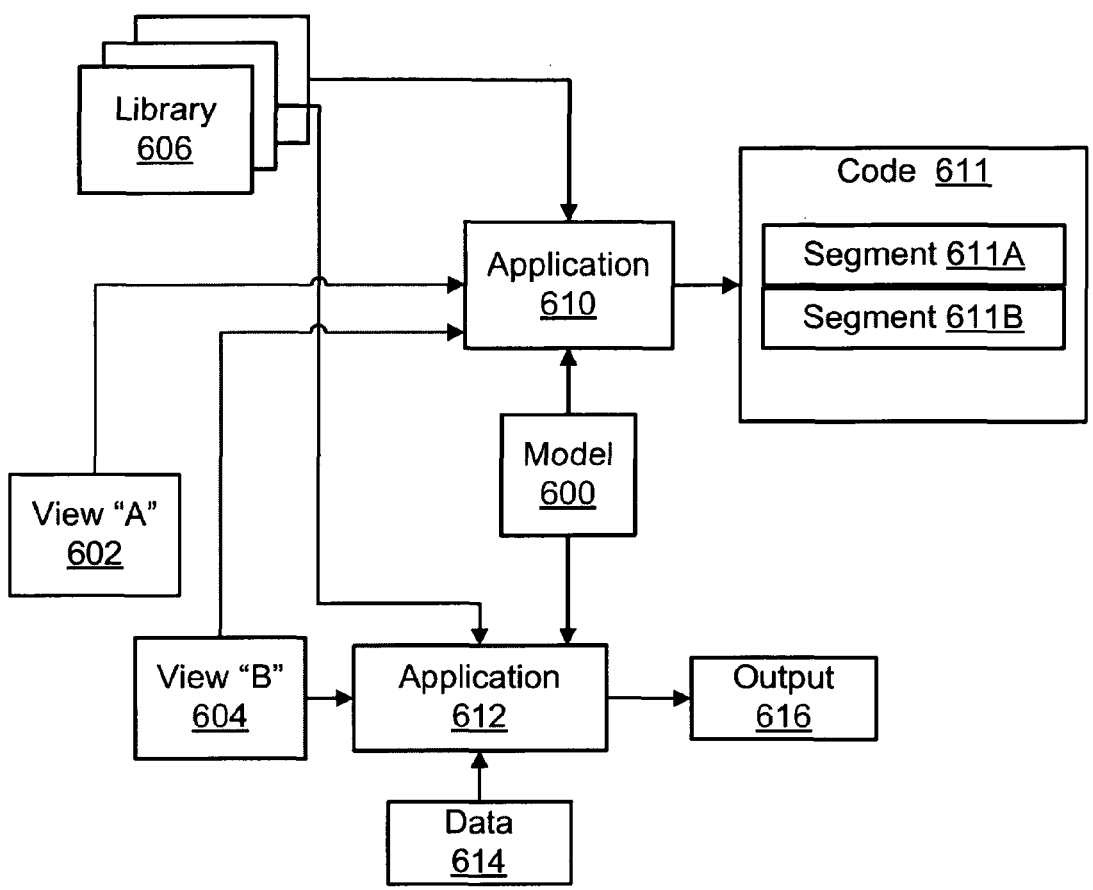
FIG. 6 is a block diagram illustrating an example of consuming a model using a view specified as part of or alongside the model.

FIG. 6 is a block diagram illustrating an example of consuming a model using a view specified as part of or alongside the model. For example, the modeling syntax may allow for specifying a model 600 along with one or more views describing user interfaces over the information expressed in the model. This example shows "View A" at 602 and "View B" at 604. It should be understood that "View A" and "View B" would be specified as part of model 600 or may comprise separate files or items with appropriate reference to model 600.

A view can be used to provide sufficient information for providing a user interface for viewing some or all data of a modeled component, with the view capable of comprising more than a simple reflection of the stored structure of the modeled object. Put another way, a view is an abstract definition derived from a modeled component which specifies a structural transformation of the elements of the modeled object, including grouping, reordering, or flattening the elements. A view can, but does not necessarily need to, provide "component hints" used by model consumers to control choices made in the course of generating or rendering interface functionality. For example, a hint may specify a particular version or arrangement of interface features that are preferred, but not necessary for the view. If the consuming application does not support the choices specified in the hint (s), the view can nonetheless be rendered. Additionally, a view can specify user interface behavior such as prompts, error messages, and other types of messages.

For example, model 600 may represent a relatively complex object used to store information about an employee. The object may comprise tens or hundreds of interrelated data items. A database may store the object as a "flat" row. Similarly, the object may be represented in memory of an application as a "flat" container of items. For display to a user, though, the data may be represented in an object having sections, pages, groupings, shortcuts, and other organizationally meaningful structural elements. A view can allow for integrated support of such structural elements. Other elements that may be specified via views include wizards, tab navigators, accordions, drop-down menus, etc. Essentially, any visual user interface paradigm can be associated with appropriate syntax in the modeling language and used to indicate how particular elements of a model should be rendered. Libraries, such as library 606, can be used to translate the view specifications into appropriate code and/or to interpret the view for rendering elements of a modeled component.

In this example, a consuming application 601 relies on model 600, view 602, view 604, and a library 606 to produce code 611. Code 611 includes code segment 611A supporting a view of data specified by model 600 in a form set forth in view 602. Code segment 611B supports a view of data specified by model 600 in a form as set forth in view 604. A second application 612 relies only on view 604 and library 606 and is provided to illustrate using model 600 at runtime to determine how to provide output 616 based on data 614 that corresponds to information represented in model 600.

Consider, for example, a modeled "Employee" object:
object EmployeeInfo is
property name,
property id
property age
property department
. . .
property phone 1,
property phone 2,
. . .

A user interface for data entry on this object may split the data entry task into two separate sub-tasks. For example, a wizard may be provided with a first page that contains personal information fields and a second page that contains contact information fields.

Rather than hand-coding the wizard for multiple implementations, one or more views of the Employee object can be defined to split the items into two groups, specify a "component hint" indicating that a wizard-style interface is the preferred choice paradigm for data capture on the object, and to enumerate the items in each page alongside annotations for prompts to use in displaying the items.

view EmployeeDataCapture on EmployeeInfo is:
component "wizard",
subview PersonalInfo
item name with prompt "Name",
item id with prompt "Employee ID",
. . . ;
subview ContactInfo
item phone1 with prompt "Primary Phone Number",
item phone2 with prompt "Secondary Phone Number",
. . . ;

This example presumes a modeling syntax that recognizes the "wizard" component and next looks for subviews to be defined for the wizard. If, instead of "component wizard," the view specified "component tabs," then the different subviews could correspond to different tabs. In the example above, the view was defined over properties. However, a view may be defined over any elements of a modeled component, including derived properties.

Views may be selected based on user input and/or by evaluating conditions tested against data values. For example, a property may be evaluated to determine if a particular part of a form is to be provided based on data entered in another portion of the form. For instance, an insurance form may include a data element for entry of a state. Different states may have different requirements, and so different parts of the form may be specified as views conditioned on the value for the "state" property.

Figure 7:
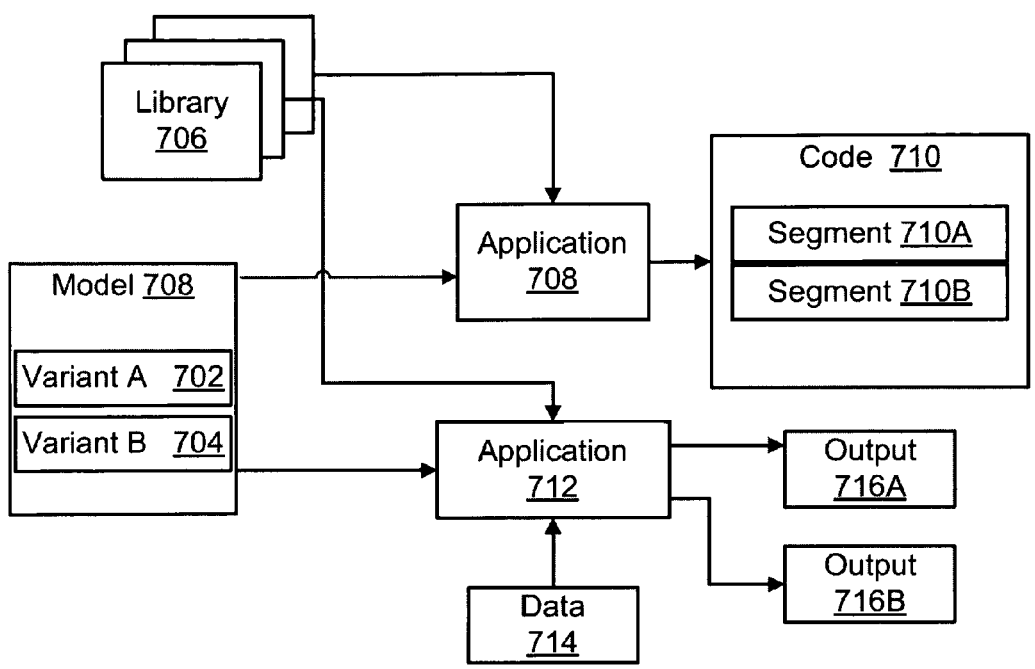
FIG. 7 is a block diagram illustrating an example of consuming a model that features variants.

FIG. 7 is a block diagram illustrating an example of consuming a model that features variants (i.e., variably-applicable portions of the model). In this example, model 700 includes a variant 702 ("variant A") and a variant 704 ("variant B"). Two model consuming units are shown: application 708, which represents a development application that generates code 710 based on model 700 and library 706, and application 712, which relies on model 700 and library 706 at runtime to render output 716 based on data 714.

In abstracting a particular component into a model, certain decisions are made when grouping elements into particular components. In some instances, two groups of elements may share multiple common elements but have certain differences. In some embodiments of the present subject matter, applications can support the use of models that have "variants" to allow for close, but inexact, matches to be considered under the same component umbrella.

As a specific example, consider a data object representing an address and comprising a data item containing a country code (e.g., "US" or "UK"), a data item holding a US ZIP code, and a data item holding a UK postal code. Abstractly, an "address" component will only have a US zip code when the country code is "US" and will only have a UK postal code when the country code is "UK" (for this example, assume only a single address is represented by each instance of the modeled component). Although a "UK Address" object and a "US Address" object could be separately defined, this could lead to complex and less flexible code.

Instead, a single "Address" component can be modeled, with the model specifying a "UK" variant and a "US" variant. When the model is consumed, the variants can be expressed in a manner that accommodates both possibilities or data can be used to select a single variant for rendering. Consider, for example, the following model of "Address":
object Address is
property addressee,
property streetAddress,
property countryCode,
variant(countryCode)
case 'US':
property usZipCode,
case 'UK':
property ukPostalCode;

This example is simplified for purposes of explanation. In practice, more complex selector expressions may be supported. For example, "variant(countryCode='US')" would be a variant with two cases: "true", when the country code is US and another case, "false," for any other countryCode. Each case could support subdefinitions. For instance, case 'US' could support further definitions based on the usZipcode. Variants could be nested, and a default case can be provided. Additionally, although this example illustrates only properties, cases may additionally or alternatively be determined based on constraints and/or derived properties.

Turning back to FIG. 7, the use of variants in model 700 can provide flexibility for users of application 708 and/or 712. For example, application 708 can generate code 710 including code segments 710A and 710B representing the variants of the modeled component. If the language of code 710 itself supports variants, then the variants may be defined using the proper syntax of the language. However, code 710 may be rendered in a language that does not readily support defining objects with variants. Instead, code segments 710A and 710B may represent different classes specified in code 710 for addressing whether the data handled by the application resulting from code 710 encounters data for use in variant A or B, with code 710 comprising functions or other appropriate elements for selecting one of the classes depending on data being handled.

For example, code segment 710A may represent a "USAddress" class while code segment 710B represents a "UKAddress" class. Additional code may be generated to evaluate the country code and select an instance of the proper class to handle data having the corresponding country code.

Application 712 may rely on model 700 to provide output at runtime based on incoming data 714. One of output 706A or output 706B may be provided depending on which variant of model 700 is invoked for a particular set of data 714. For example, application 712 may represent a process that evaluates incoming data 714 to determine whether to output a "USAddress" object or a "UKAddress" object by evaluating a country code specified in the incoming data.

Figure 8:
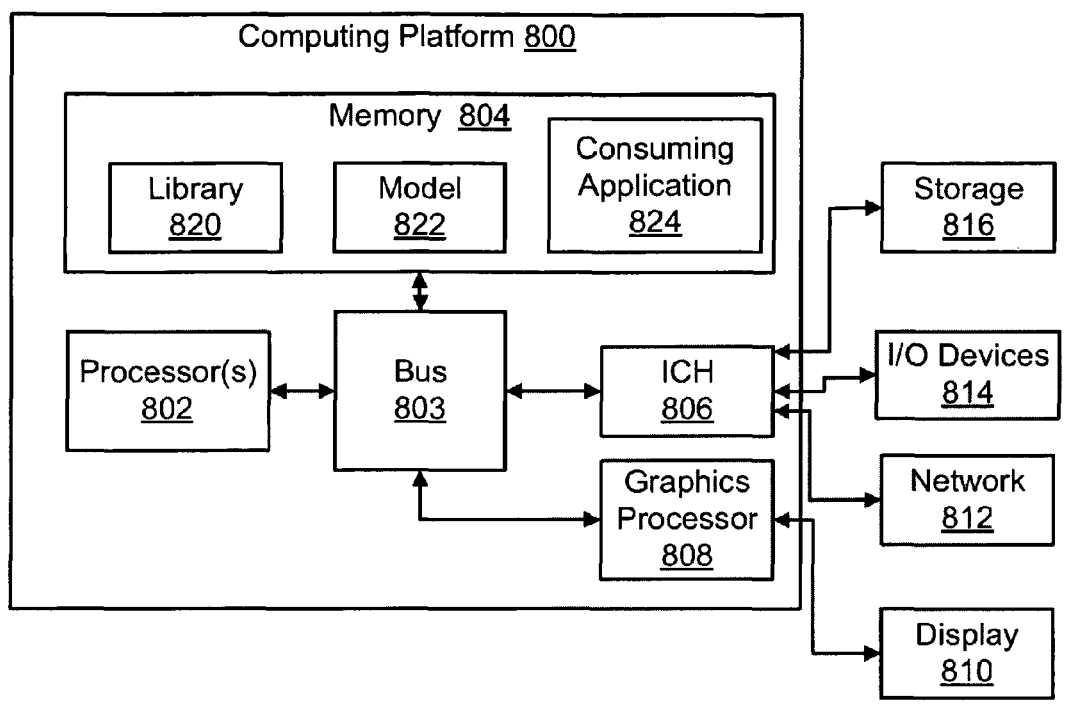
FIG. 8 is a block diagram illustrating an exemplary computing platform.

FIG. 8 illustrates an example of computing platform 800 suitable for implementing embodiments of the methods and systems as described in the examples above. The exemplary computing platform of FIG. 8 comprises: one or more processors 802; memory 804, representing one or more computer-readable media accessible by processor(s) 802 (e.g., processor cache, volatile memory such as DDR RAM, EDO RAM, etc, nonvolatile memory such as flash memory, etc.); an I/O control hub (ICH) 806; a graphics processor 808; and a bus 803. Graphics processor 808 is shown as connected to a display 810 of which different types exist such as Cathode Ray Tube (CRT), Thin Film Transistor (TFT), Liquid Crystal Display (LCD), DPL, etc. ICH 806 facilitates connection to various devices including a network interface component 812 (e.g., for connection to a local area network, wide area network, etc.); user I/O devices 814 (e.g., keyboard, touchpad, mouse, etc.); and storage 816 (e.g. a local or remote disk).

The one or more processors 802 execute instructions in order to perform whatever software routines the computing system implements. The instructions frequently involve some sort of operation performed upon data. Memory 804 is deliberately made available to other components within the computing platform. For example, the data received from various interfaces to the computing system (e.g., keyboard and mouse, printer port, LAN port, modem port, etc.) or retrieved from an internal storage element of the computing system (e.g., hard disk drive) are often temporarily queued into memory 804 prior to their being operated upon by the one or more processor(s) 802 in the implementation of a software program. Similarly, data that a software program determines should be sent from the computing system to an outside entity through one of the computing system interfaces, or stored into an internal storage element, is often temporarily queued in memory 804 prior to its being transmitted or stored.

The ICH 806 is responsible for ensuring that such data is properly passed between the memory 804 and its appropriate corresponding computing system interface (and internal storage device if the computing system is so designed).

FIG. 8 further illustrates library 820, a model 822, and a consuming application 824 resident in memory 804. For example, some or all of library 820 may be loaded into memory for use by consuming application 824 in interpreting model 822. For example, consuming application 824 may use model 822 to produce code or other components in a development application or to produce output based on evaluating incoming data using model 822. Memory 804 may include additional components such as an operating system to coordinate operation of the computing platform and facilitate the interaction of consuming application 824 with library 820 and model 822. In some embodiments, consuming application 824 could, of course, comprise an operating system configured to consume models, and so it should be understood that this example is not meant to limit the present subject matter.

Figure 9:
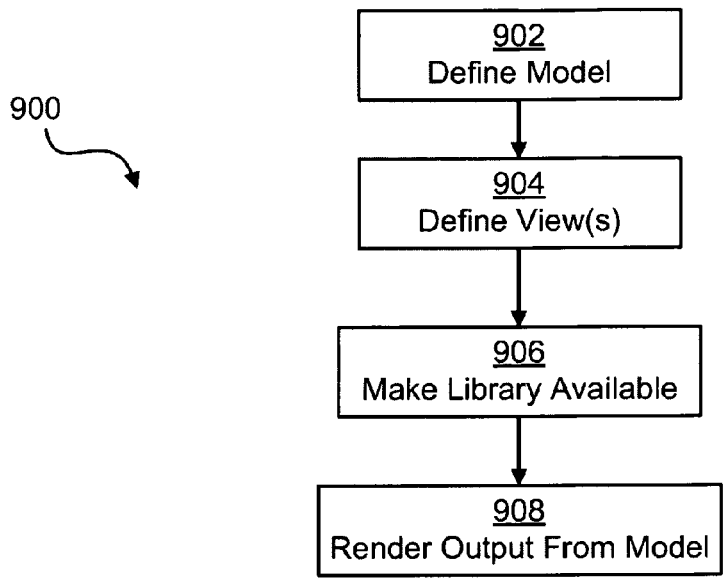
FIG. 9 is a flowchart illustrating an exemplary modeling workflow.

FIG. 9 is a flowchart illustrating an exemplary modeling workflow 900. Block 902 represents defining a model for a component and block 904 represents defining one or more views for the component. For example, a modeling language may specify an XML or other suitable syntax for specifying properties, behaviors, and views. The details may be provided via a suitable user interface. For example, an application may support modeling using data received as text input by a user or menu selections for various components of the model. As another example, an existing database schema may be imported and used as a framework for specifying the model.

Block 906 represents making a library available for model-consuming units such as applications, processes, components, and other functional software units. Different model consumers may use different versions of the library to enable meaningful consumption of models. For example, a library may be specified to allow JAVA-based applications to access models while another library specifies how to access models for C++-based applications. Another library may allow for a model to be converted directly into executable code at runtime. In some embodiments, a library may be expressed in one language (e.g. JAVA) but allow rendering of models into a different language (e.g., C++, ACTIONSCRIPT™).

Essentially, the core library provides a programmatic representation of the object that is the model; put another way, the library abstractly defines what a 'model' is in terms of a specific programming (or execution) language and how elements of a 'model' are to be expressed in the programming language. The library can comprise appropriate representations for different languages. Through use of the library, the model can be exposed as a useful structure to other software. Since the model includes properties and behaviors for the modeled component, the software with access to the module can provide a wide variety of output, including entire applications with user interface components defined by reference to the model and view(s).

For example, the libraries may be implemented in Java for use as a plug-in component for ADOBE® FLEX® BUILDER™ so that MXML and ActionScript code can be used to develop a project using one or more behavioral data models.

A library may be accessed when defining a model and/or view. For example, a model may be "resolved" by reference to the library to ensure that the model is consistent, uses proper types and expressions, etc. In some embodiments, a tool may support user interaction for defining a model based on evaluating other data as noted above. Once a valid model is available, it is usable via a programmatic API (application programming interface).

Block 908 represents rendering output from a model based on the model and library (and view(s) as appropriate). A wide variety of model consumption can be supported, as any software with knowledge of the API and access to the corresponding library can utilize models developed based on the API.

For example, if the model is loaded into a development application such as FLEX® BUILDER™ noted above, the model may be present in memory as a collection of linked Java objects hosted by the core (target-independent) part of the plug-in. The developer may invoke a code-generation function, provided by the non-core (target-specific) part of the plug-in. In some embodiments, this code generation may produce both code for client-side and server-side program components based on the model. On the client side, generated Flex code components will provide the application runtime functionality for requesting, modifying and saving the data objects defined in the model. On the server side, generated code will vary depending on the kind of server used in the project, but may include generated scripts for handling client requests for data objects defined by the model.

As another example, the developer may deploy the model to a J2EE server running one or more data services applications containing or having access to the core libraries described above and can be configured to perform model-driven operations directly based on a model. The model is deployed by sending its XML definition over the network to the running server. The server examines the model and creates remote destinations, available to clients, for requesting and saving model-defined data objects.

As a further example, models may also be used by development applications to provide a simpler, more guided development experience for less technical users. In this case, application information is collected by wizards and/or silent database introspection (i.e. by sampling and analyzing data from the database), and stored in a model "behind the scenes." Subsequent modification of the model is presented to the user in a way which insulates them from model details. In such cases, the program component(s) generated from the model are accessed by other program components of the development application to provide output and/or handle input from the developer.

As another example, models can be used as service descriptors to be consumed by an open set of applications. The scenarios above have a model being created as part of a project that includes a specific client. However, models may also be created to describe data services for use by clients that don't yet exist. In this case, the model is created in a tool as above, and then stored in a repository or on a server, in a way that allows future clients to request it.

These requests may come at client development time, in which case code may be generated from the model as described above. Or the requests may come at client runtime, in the case of a completely dynamic client. Here, models are being used as a rich (behavioral) description of a service.

Several examples above featured models stored in a computer-readable medium and created for use by human developers. However, in some embodiments, models may be created for in-memory use only by other software, rather than human developers. Such synthetic models may be completely transient, and never saved to disk, in which case they would only live as Java objects embodied in memory or another computer-readable medium while used without being explicitly defined in XML.

Figure 10:
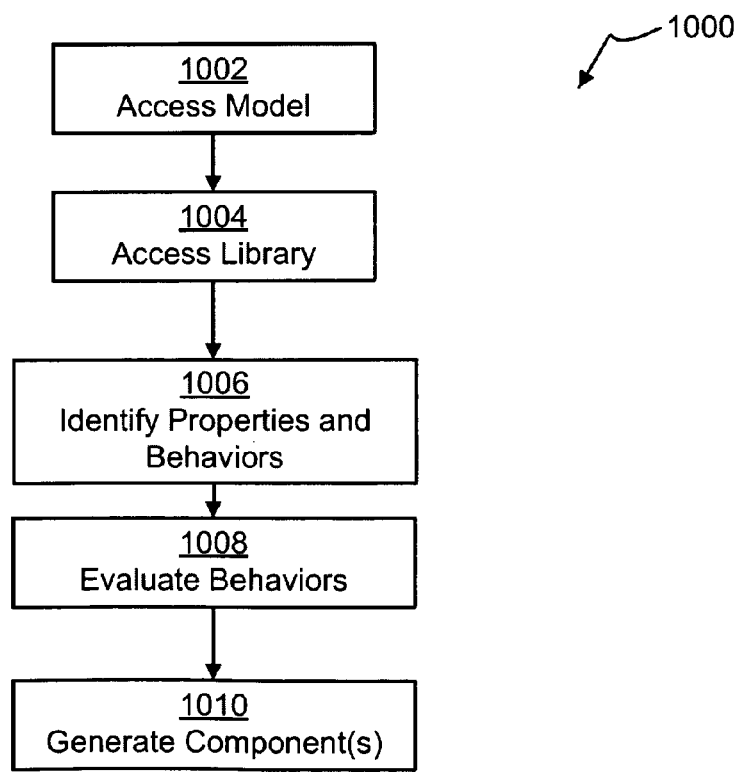
FIG. 10 is a flowchart illustrating an exemplary method of consuming a model.

FIG. 10 is a flowchart illustrating an exemplary method 1000 of consuming a model to generate one or more program components. Blocks 1002 and 1004 represent accessing the model and accessing the library or other suitable components representing the model API. Several examples herein refer to use of the library. However, model support may be built into a particular consuming application without the need to separately access the library. In some embodiments, models may be dynamically supported by reference to libraries (e.g. via DLL, modules, or another suitable implementation).

Block 1006 represents identifying the properties and behaviors specified in a model. This can be accomplished by recognizing the model syntax via reference to the library while parsing the model. For example, the portions of the model that identify the modeled component, its properties, its derived properties, its constraints, its variants, and the like can be represented in memory of the software application that is to consume the model.

Block 1008 represents evaluating the behaviors specified in the model. For example, if derived properties are specified via functions using a model-specific syntax, then at block 1008 those functions can be made available as an in-memory data structure (i.e., in a form that does not use the model-specific syntax) by the library APIs. By use of these APIs, the functions can be converted into a form suitable for evaluation, such as executable code in the target language, by the software application consuming the model.

If "live" values for the properties are available to the software consuming the model, then the constraints can be evaluated and variants selected based on evaluating the properties and other elements that depend on "live" values. The "live" values may correspond to data values for the properties that are used in specifying the constraints, variants, or other behaviors.

Block 1010 represents generating one or more components based on the model. In view of the wide applicability of modeling as set forth herein, it will be understood that the particulars of block 1010 will depend on the underlying purpose for consuming the model. For example, if the model is consumed for code generation, the particular components that are generated may depend on what type of code is to be generated and the purpose of the code. Thus, the consuming software application can rely on user input to determine what type(s) of output are to be generated based on the model.

For instance, a user may indicate that an application is to generate code representing an object corresponding to the model for use in an application under development. As another example, a user may indicate that a validation process is being coded. For instance, a sub-process or routine for validating an "Adult" object may be generated based on the "Adult" model with its constraint. A different model consuming application may be used to design a database by specifying table definitions. The "Adult" model may be used to determine which columns to include in the database.

Not all portions of a model need be used for an output scenario. For example, the constraints of the "Adult" model may not be expressed as columns in a database schema, but may be used in generating a client process or server back-end process. As another database-related example, variants such as the US zip code and UK postal code example above, may or may not be expressed in the same way—for instance, the database may include a column for both values rather than selecting a single value as was suggested for other types of output. When designing a database based on a model that includes derived properties, the derived properties may be omitted from the database since including the derived properties may be duplicative.

As another example, block 1010 may represent generating instructions for execution by a computing platform—that is, the model may be used to control operation of a computing device by evaluating one or more input values without source code being generated.

As was noted above, in some embodiments, a code generating application can produce source code to render a model. The model may be used to define an object or class in a source code for an application under development along with functions and methods for populating properties of the object or class. As another example, the model may be used to define a database table or tables or to otherwise organize a set of data that is represented by the model. As another example, a model may be used to generate code for providing a data capture screen or to provide the data capture screen through direct execution of the model.

In some embodiments, block 1010 can be omitted—for instance, once an in-memory representation of the modeled component is available, the representation may be used directly by consuming applications as noted above.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Some portions of the foregoing detailed description are presented in terms of algorithms, discussions, or symbolic representations of operations on data bits or binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art.

An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a specific apparatus, such as a special purpose computer or a special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A computer-implemented method comprising:
   accessing a model of a modeled component, the model comprising a property, a derived property, and a constraint, wherein the property defines a data element of the modeled component, wherein the derived property comprises a programmatic expression defining a function of an input parameter comprising data stored via the property, wherein the constraint comprises a condition to be met by a value of the derived property;
   generating an in-memory representation of the modeled component, the in-memory representation comprising a data structure corresponding to the property, a data structure corresponding to the derived property, and a functional component comprising code configured to access the input parameter determine the value of the derived property, and evaluate data stored in the data structure corresponding to the derived property against the constraint and store data representing whether the constraint is satisfied.

2. The method set forth in claim 1, wherein the method further comprises accessing a modeling library and using the modeling library to parse the model to determine the data structure and code from the property and programmatic expression.

3. The method set forth in claim 1, further comprising using the functional component to process data, including executing the code of the functional component to determine the value of the derived property and store the value in the data structure corresponding to the derived property.

4. The method set forth in claim 1, further comprising outputting a program component based on the in-memory representation of the modeled component.

5. The method set forth in claim 4, wherein the program component is output as source code for a second computer application.

6. The method set forth in claim 1, wherein the constraint indicates a validity condition for the modeled component and the stored data indicates whether the modeled component is valid.

7. The method set forth in claim 1, further comprising executing the code of the functional component to evaluate the value of the derived property against the constraint.

8. The method set forth in claim 1, wherein the in-memory representation provides a user interface, a database table definition, or a server process.

9. The method of claim 4, wherein outputting the program component based on the in-memory representation of the modeled component comprises:
   accessing a library comprising definitions for the data structure corresponding to the property, the data structure corresponding to the derived property, and the functional component; and
   generating the program component based on the model and the library.

10. The method of claim 4, wherein the program component is outputted as a validation process for validating one or more objects corresponding to the modeled component.

11. A computer system comprising a processor with access to a computer-readable medium, the computer-readable medium embodying program components comprising:
    a model of a modeled component, the model comprising, a derived property, and a constraint, wherein the property defines a data element of the modeled component, wherein the derived property comprises a programmatic expression defining a function of an input parameter comprising data stored via the property, wherein the constraint comprises a condition to be met by a value of the derived property;
    a computer application configured to: generate an in-memory representation of the modeled component, the in-memory representation comprising a data structure corresponding to the property, a data structure corresponding to the derived property, and a functional component comprising code configured to access the input parameter determine the value of the derived property, and evaluate data stored in the data structure corresponding to the derived property against the constraint and store data representing whether the constraint is satisfied.

12. The computer system set forth in claim 11, wherein the computer application is configured to use the functional component to process data, including executing the code of the functional component to determine a value for data corresponding to the derived property.

13. The computer system set forth in claim 11, wherein the computer application is configured to output a program component based on the in-memory representation of the modeled component.

14. The computer system set forth in claim 13, wherein the program component is output as source code for a second computer application.

15. The computer system set forth in claim 11, wherein the constraint indicates a validity condition for the modeled component and the stored data indicates whether the modeled component is valid.

16. The computer system set forth in claim 11, wherein the computer application is configured to generate a plurality of different types of program components using the model.

17. A computer-readable medium having program code stored thereon, executable by a computer system, the program code comprising:

program code for accessing a model comprising a property, a derived property, and a constraint, wherein the property defines a data element of the modeled component, wherein the derived property comprises a programmatic expression defining a function of an input parameter comprising data stored via the property wherein the constraint comprises a condition to be met by a value of the derived property;

program code for generating an in-memory representation of the modeled component, the in-memory representation comprising a data structure corresponding to the property, a data structure corresponding to the derived property, and a functional component comprising code configured to access the input parameter, determine the value of the derived property, and evaluate data stored in the data structure corresponding to the derived property against the constraint and store data representing whether the constraint is satisfied.

18. The computer-readable medium set forth in claim 17, further comprising program code for using the functional component to evaluate the input parameter and for storing data corresponding to the derived property in the data structure corresponding to the derived property.

19. The computer-readable medium set forth in claim 17, wherein generating comprises accessing a modeling library and using the modeling library to parse the model to determine the data structure and code from the property and programmatic expression.

20. A computer-implemented method comprising:

executing instructions on a specific apparatus to access binary digital electronic signals representing a model of a modeled component, the model comprising a property of the modeled component and a programmatic expression defining a constraint to be met by the value of the property;

executing instructions on the specific apparatus to generate binary digital electronic signals representing a data structure corresponding to the property;

executing instructions on the specific apparatus so that input is received and stored in the data structure corresponding to the property, the input comprising binary digital electronic signals representing a value of the property;

executing instructions on the specific apparatus to generate binary digital electronic signals representing code for evaluating the binary digital electronic signals stored in the data structure corresponding to the property to determine if the value of the property meets the constraint; and executing instructions on the specific apparatus to generate binary digital electronic signals indicating whether the constraint is met.

* * * * *